United States Patent [19]
Thornthwaite et al.

[11] Patent Number: 5,198,232
[45] Date of Patent: * Mar. 30, 1993

[54] INJECTION MOULDING APPARATUS

[75] Inventors: John B. Thornthwaite; Robert Naismith, both of Nottingham, England

[73] Assignee: Games Workshop Limited, Nottinghamshire, United Kingdom

[*] Notice: The portion of the term of this patent subsequent to May 7, 2008 has been disclaimed.

[21] Appl. No.: 701,856

[22] Filed: May 17, 1991

Related U.S. Application Data

[60] Continuation of Ser. No. 652,674, Feb. 8, 1991, Pat. No. 5,151,232, which is a division of Ser. No. 551,647, Jul. 12, 1990, Pat. No. 5,013,228, which is a continuation of Ser. No. 248,068, Sep. 23, 1988, abandoned.

[30] Foreign Application Priority Data

Jul. 26, 1987 [GB] United Kingdom ............ 8722668

[51] Int. Cl.⁵ .................. B29C 45/46; B29C 45/40
[52] U.S. Cl. ................................ 425/2; 249/134; 425/440; 425/542; 425/DIG. 44; 425/DIG. 47
[58] Field of Search ............. 425/DIG. 44, 2, 55, 425/56, 192 R, 193, 195, 542, 190, 183, 440, 441, 408, 116; 264/225, 227, 328.1, 328.9, 222; 249/134

[56] References Cited

U.S. PATENT DOCUMENTS

| | | | |
|---|---|---|---|
| 3,173,974 | 3/1965 | Mohr | 425/DIG. 44 |
| 3,601,355 | 8/1971 | Fleck | 264/225 |
| 3,813,201 | 5/1974 | Frederick et al. | 425/DIG. 44 |
| 4,202,522 | 5/1980 | Hanas et al. | 425/186 |
| 4,350,486 | 9/1982 | Croseck et al. | 425/DIG. 44 |
| 4,374,636 | 2/1983 | Holmes | 425/DIG. 44 |
| 4,601,867 | 7/1986 | Martell et al. | 264/227 |
| 4,701,117 | 10/1987 | Takaoka et al. | 425/116 |
| 4,704,079 | 11/1987 | Pluim, Jr. | 425/190 |
| 4,779,835 | 10/1988 | Fukushima et al. | 425/408 |
| 4,793,785 | 12/1988 | Osada | 425/190 |
| 5,013,228 | 5/1991 | Thornthwaite et al. | 425/2 |

Primary Examiner—Jay H. Woo
Assistant Examiner—Khanh P. Nguyen
Attorney, Agent, or Firm—Dickstein, Shapiro & Morin

[57] ABSTRACT

A mould for an injection moulding apparatus, the moulding including at least two mould parts which mate to form the mould cavity and which separate to permit removal of the moulded article, each mould part including a relatively rigid body having an abutment face which abuts with an abutment face of the other mould part when said parts mate, the body of at least one mould part including a recess in its abutment face which is filled with a resilient material defining a portion of said mould cavity.

11 Claims, 2 Drawing Sheets

INJECTION MOULDING APPARATUS

This application is a continuation of application Ser. No. 07/652,674, filed on Feb. 8, 1991 U.S. Pat. No. 5,151,232; which is a divisional application of application Ser. No. 07/551,647, filed on Jul. 12, 1990 (issued as U.S. Pat. No. 5,013,228 on May 7, 1991); which is a continuation of application Ser. No. 07/248,068, filed on Sep. 23, 1988 (now abandoned).

BACKGROUND OF THE INVENTION

Field of the Invention

The present invention relates to an injection moulding process, articles moulded by the process, and an injection moulding apparatus.

Description of the Related Art

Injection moulding of thermoplastics to create a product requires the creation of a separable mould. The mould normally comprises two mould parts and these mould parts may incorporate movable core inserts for the moulding of intricate shapes having undercuts.

Generally, acute undercuts in a moulding are not possible without a complicated mould construction which results in expensive tooling costs. In addition such moulds can take many months to produce. Even if a mould is produced for providing undercuts, the number of undercuts provided will be restricted such that, in the main, only straightforward geometrical shapes are produced using these techniques.

These drawbacks become more apparent when articles of non-geometric random shape are to be moulded. Such articles may for instance be models of animal shapes.

Heretofore, injection moulded models of animal shapes made from plastics have lacked realistic detail in shape due to the inability of conventional injection moulding techniques to produce many randomly shaped undercuts and fine detail. In addition since the mould cavity in the injection mould parts is defined by metal it has to be shaped using erosion techniques such as spark erosion or pantography and consequently it is not possible to accurately recreate the fine detail of an original, artistically, created sculpture.

In addition it will be appreciated that because of the high cost of creating injection moulds it is not economically practical to produce a relatively small number of mouldings of one particular model and is similarly not economically practical to produce a large number of moulds for creating a wide variety of such models.

SUMMARY OF THE INVENTION

It is a general aim of the present invention to provide a mould for an injection moulding apparatus which is capable of producing articles of either a geometric or a non-geometric random shape, in particular replicas of sculptures such as miniatures or models of character figures.

According to one aspect of the present invention, there is provided a mould for an injection moulding apparatus, the mould comprising at least two mould parts which made to form the mould cavity and which separate to permit removal of the moulded article, each mould part comprising a relatively rigid body having an abutment face which abuts with an abutment face of the other mould part when said parts made, the body of at least one mould part having within its abutment face a resilient material defining a portion of said mould cavity.

Preferably the resilient material projects above the abutment face of the mould part so that on closing of the mould parts the resilient material is placed under compression.

Preferably all mould parts include a recess in its abutment face each containing a resilient mould insert. The resilient mould insert for insertion in the or each recess maybe in the form of a block directly insertable into the or each recess or may be a block located on a rigid support body for insertion into the or each recess. The support body may be a backing plate to which the block of resilient material is attached. Alternatively the support body may contain a recess formed in an abutment face which is contiguous with the abutment face of the mould part body when the support body is located within the mould part. Preferably the resilient material is a thermoset elastomer. The elastomer may be a composition based upon a synthetic rubber or a natural rubber.

The recess may be filled by moulding the resilient material in situ or by inserting a preformed block of resilient material into the recess.

Location formations may be provided in selected positions about the cavity portion defined in the resilient material such that when the mould parts mate the location formations co-operate to resist relative slidable movement of the contacting surfaces of the resilient material of respective mould parts.

According to another aspect of the present invention there is provided a process for creating resilient mould inserts for an injection mould comprising the steps of placing an article of which subsequent mouldings are to be produced between separable cast mould parts containing a mouldable material which is curable to form a resilient material, closing the cast mould parts so as to press the article into the mouldable material contained within the cast mould parts so as to create an impression of the article in said mouldable material, curing said mouldable material to form said resilient material so as to retain said impression and then separating the mould parts to remove said article.

Attachment means, such as a rigid backing plate or bolts, for subsequently attaching to the mould insert into the injection mould may be located within the cast mould parts so as to be attached to the resilient material during the curing process. It is envisaged that such attachment means may be secured to the resilient material after removal from the cast mould. It is also envisaged that the cast mould itself could be used as attachment means in which case the resilient material is retained within the cast mould part after the curing process.

Thereafter the resilient mould inserts can be fitted to an injection moulding machine and used to produce replicas of said article. Preferably said mouldable material is a composition based upon a synthetic rubber or a natural rubber and which on the application of heat is cured to define said resilient material. Preferably said mouldable material is reclaimed rubber originating from tyres. Curing of the rubber is achieved by maintaining the cast mould parts, whilst closed, at an elevated temperature for a sufficient length of time to enable vulcanisation of the rubber to occur.

According to another aspect of the present invention there is provided a process for producing injection moulding comprising forming an injection mould as defined above and injecting a moulding material into said mould to produce a moulding.

In view of the resiliency of said resilient material and the resiliency of the plastics material used for creating the moulding, the moulded article may have acute undercuts which do not prevent the article being removed from the mould cavity.

In addition fine detail of the original article is recreated by the mould since the mould cavity is formed as an impression of the original article.

In view of the simplicity of forming an injection mould according to the present invention it is possible to create a high quality of reproduction for geometric or non-geometric shapes very economically. In particular the present process thereby makes it economically practical to produce high definition moulds for producing small quantities of replicas of an original model and also to produce a wide variety of such moulds. Large volumes of such replicas can also be produced simply by replacing worn out moulds.

BRIEF DESCRIPTION OF THE DRAWINGS

An example of a process of producing a mould according to the present invention is hereafter described with reference to the accompanying drawings, in which.

DESCRIPTION OF THE PREFERRED EMBODIMENT

Figure 1:
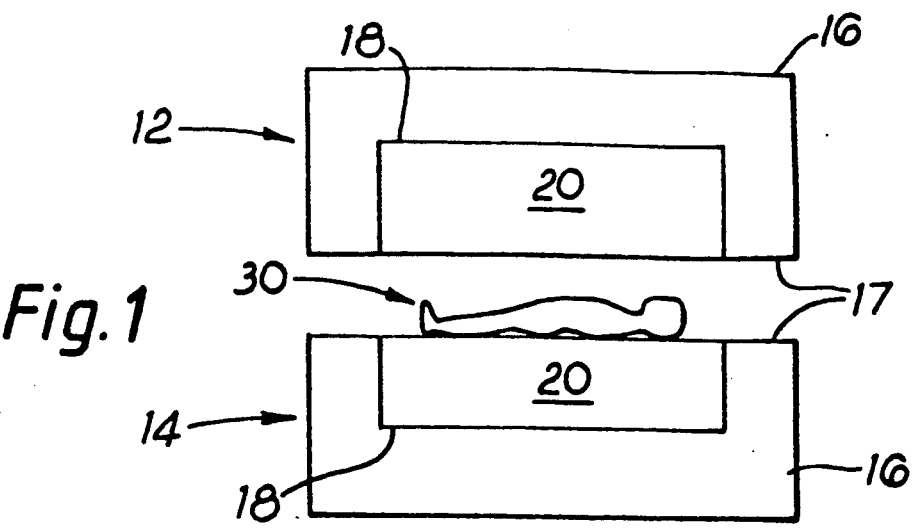
FIG. 1 is shown as a schematic side section view of a pair of mould parts shown in an open position.
Figure 2:
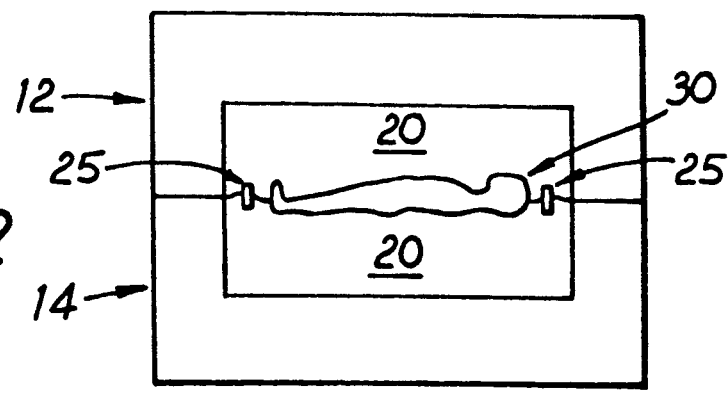
FIG. 2 is a similar view to FIG. 1 showing the mould parts closed so as to mate.

In FIGS. 1 and 2 there is shown a pair of cast mould parts 12, 14 each of which comprises a relatively rigid body 16. Each part 12, 14 includes an abutment face 17 which are in mutual contact when the mould parts made and each abutment face 17 is provided with a recess 18 which is filled with a mouldable material 20 which is curable to form a resilient heat stable material. A rubber composition based upon rubber reclaimed from tyres has been found suitable for moulding thermoplastics such as polypropylene.

The out surface of the mouldable material 20 is arranged to be substantially contiguous with the abutment face 17 and prior to creating an impression is preferably coated with a release agent such as talcum powder.

An original sculpture or article 30 from which replicas are to be made is positioned between the mould parts 12, 14 and these are then closed by, for instance, a press (not shown). Closing of the cast mould parts causes the article 30 to be pressed into the opposed faces of the mouldable materials and causes an impression to be made therein. Due to the flow characteristics of the mouldable material a natural separation line around the periphery of the article is achieved between the opposed surfaces of the mouldable materials.

The closed cast mould parts are now heated to cause the rubber compound to vulcanise and thereby form a heat stable resilient material. The mould parts are now separated and the article is removed to leave a mould casting 50 (see FIGS. 3 and 4).

Figure 3:
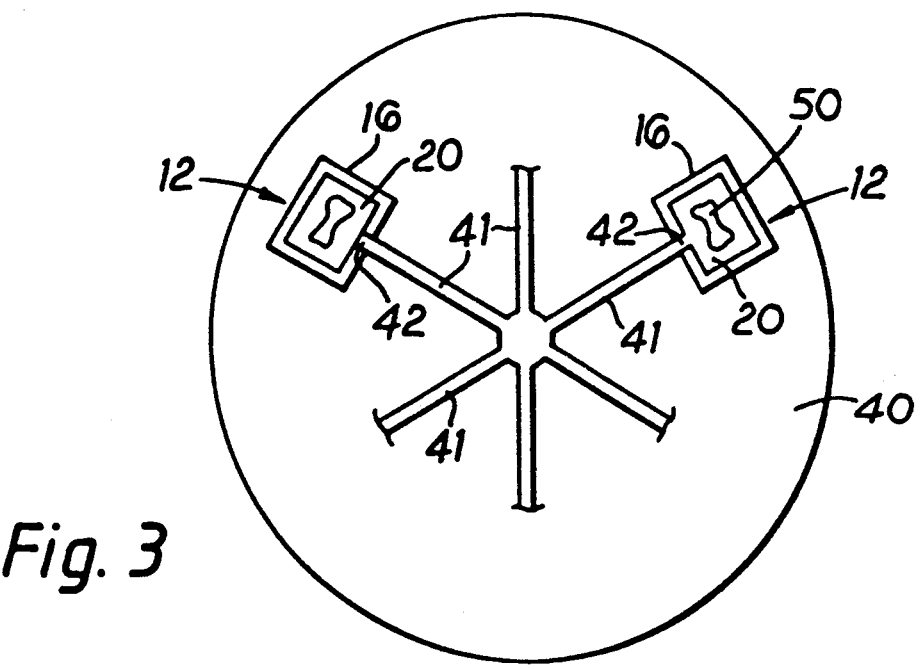
FIG. 3 is a schematic end view of a mould platen in an injection moulding machine.
Figure 4:
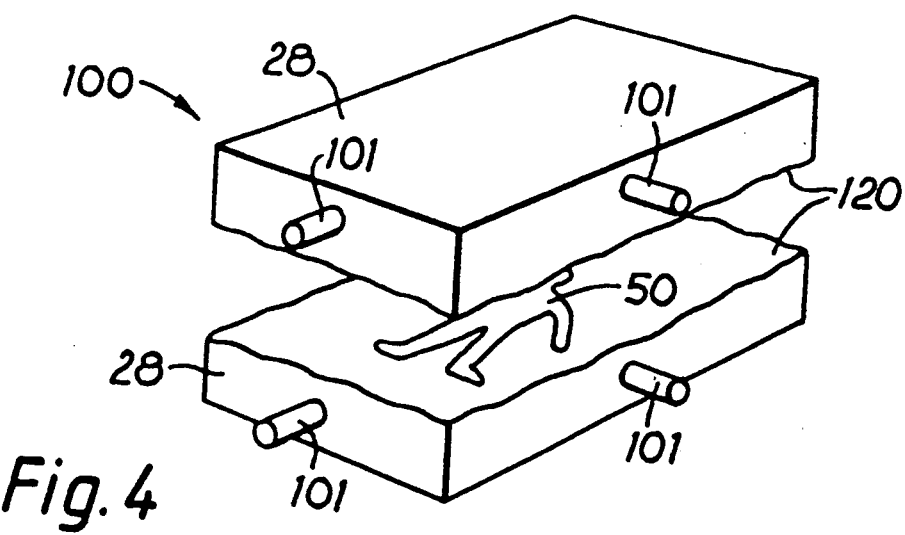
FIG. 4 is a schematic perspective view of a pair of separated mould inserts according to one embodiment of the invention.
Figure 5:
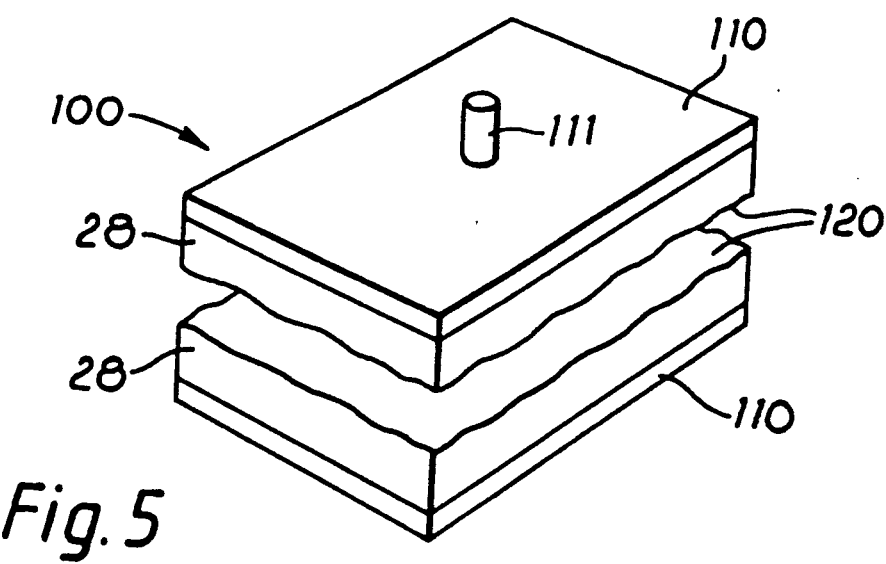
FIG. 5 is a schematic perspective view similar to FIG. 4 showing a second embodiment of the invention.

The bodies of resilient material 28 may now be removed from the cast mould parts 12, 14. Thereby defining a pair of mould inserts 100, in block form, formed from the resilient material. The pair of mould inserts 100 can be directly mounted into opposed mould platens 10 (only one of which is shown in FIG. 3) of an injection moulding machine. Attachment means, for example bolts 101 FIG. 4) or a rigid backing plate 110 (FIG. 5) may be received to the resilient material prior to insertion of the mould insert into the mould platens 40. The backing plate 110 may include one or more bolts 111.

Advantageously the attachment means are located with the cast mould parts so that the attachment means become secured to the resilient material during the curing process.

It is envisaged that the backing plate 110 may be attached to the resilient material after casting, for instance by bonding.

Figure 6:
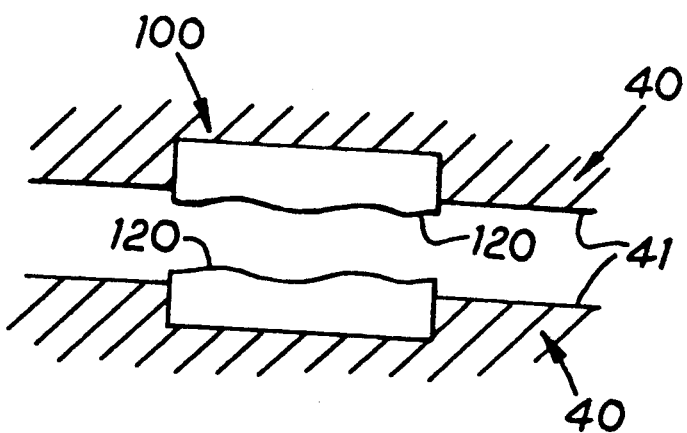
FIG. 6 is a schematic part cross-section through opposed mould platens illustrating mould inserts in situ.

Preferably, as schematically illustrated in FIG. 6, the resilient mould inserts 100 when located within the opposed platens 40 are positioned such that the separation surfaces 120 of the mould inserts 100 are located slightly above the abutment faces 41 of the platens 40. Accordingly when the mould platens 40 close, the opposed surfaces 120 of the mould inserts initially contact one another and then are placed under a resilient loading caused by compression of the resilient material as the platens reach their fully closed position. The resilient loading on the opposed surfaces 120 resists flashing occuring during the injection moulding process.

As illustrated in FIG. 2, it is envisaged that location formations, such as pegs 25, may be spaced about the mould cavity such that when the mould inserts 100 are closed the location formations co-operate to resist relative slidable movement of the opposed surfaces 120.

As illustrated in FIG. 3, it is envisaged that the cast mould parts can be used as attachment means. In this case the opposed surfaces 120 of the resilient material are substantially contiguous with the abutment faces 17 of the mould parts.

The body 16 of each mould part has an outer shape complementary to that of a location recess formed in a platen 40 of an injection moulding machine. Accordingly the body 16 can be accurately located in the platen 40 whilst being easily removable to facilitate replacement of the mould inserts.

The platen 40 shown in FIG. 3 includes radially extending channels 41 along which plastics is injected. Each body 16 has a channel 42 formed therein for communication with a respective channel 41. After curing and separation of the mould parts 12, 14 a channel (not shown) is cut into the resilient material for feeding plastics material from the channel 42 of the body to the mould cavity portion formed therein.

When casting the resilient inserts the size of each recess 18 of the cast mould parts and the amount of mouldable material contained therein is chosen to provide sufficient mouldable material to provide an adequate impression. Preferably in order to assist heat dissipation during the moulding process the amount of mouldable material is chosen to be a minimum to obtain the above criteria. In addition it is envisaged that the bodies 16 may be provided with ducts for coolant fluid which communicate with coolant ducts formed in the supporting platen 40.

In addition, the resilient material at least in the vicinity of the mould cavity is preferably arranged to be of a minimum thickness so as to resist distortion of the mould cavity arising from fluid pressure of the moulten plastics during the injection moulding process.

In order to assist heat dissipation the mouldable material may be adapted to improve its heat conductivity. For instance the chemical composition of the mouldable material may be adjusted to maximise its heat conductivity and/or the mouldable material may include particles of a good heat conductor such as metallic particles dispersed therein. In addition, or as an alternative, coolant conduits, such as metallic pipes, carrying a coolant may extend into the recess 18 so as to be partly or wholly surrounded by the mouldable material. Furthermore, blocks of suitable metals may be located within the mouldable material to act as heat sinks. These blocks may be in direct contact with the body 16 to thereby provide a good path of heat conduction from the mouldable material and into the body 16.

We claim:

1. A mold for a thermoplastics injection molding machine, comprising:
   a first mold part having a relatively rigid body portion and an abutment face within said rigid body portion;
   at least one additional mold part having a relatively rigid body portion and an abutment face within said rigid body portion of said additional mold part which may abut said abutment face of said first mold part;
   said relatively rigid body portion of said first mold part further having a recess within its said abutment face and a mold insert being made of resilient material and having a contact face and positioned with said recess and said contact face projecting above said abutment face such that when the first and at least one additional mold part are positioned against one another the contact face of said mold insert first contacts the abutment face of said additional mold part and is compressed by said additional mold part and, upon further closing, the abutment face of said first mold part abuts the abutment face of said additional mold part and a mold cavity is formed by the mold insert of the first mold part, said mold cavity being suitable for forming a molded article by thermoplastics injection molding and when the first and at least one additional mold part are moved away from one another they permit removal of said molded article;
   an injection means for injecting thermoplastics fluids under pressure; and
   an inlet channel open at one end to said injection means and open at the other end to said mold cavity.

2. A mold according to claim 1 wherein said each additional mold part has a recess within its respective abutment face and mold insert positioned within each said recess such that said mold inserts form said mold cavity when said mold parts abut one another, each said mold insert being made up of said resilient material and having a contact face which projects above the corresponding abutment face so that when said mold parts are positioned in contact with one another, the contact faces are compressed against one another and, upon further closing, the abutment faces abut one another and further wherein when said molded article is removed from each said mold insert, a part of each mold insert is moved by said molded article with respect to each said relatively rigid body of each said additional mold part to permit removal of said molded article and once said molded article is removed from each said additional part, each said mold insert substantially returns to its original position with respect to each said relatively rigid member of each said additional mold part.

3. The mold according to claim 1 wherein the resilient material is a thermoset elastomer.

4. The mold according to claim 2 wherein the resilient material is a thermoset elastomer.

5. The mold according to claim 3 wherein the elastomer is a composition including natural rubber.

6. The molding according to claim 3 wherein the elastomer is a composition including synthetic rubber.

7. The mold according to claim 4 wherein the elastomer is a composition including natural rubber.

8. The mold according to claim 4 wherein the elastomer is a composition including synthetic rubber.

9. A mold according to claim 2 wherein each said mold insert of each said recess is defined by a block of said resilient material which may be directly inserted into each said recess.

10. A mold according to claim 9 wherein each said block of said resilient material has attachment means for securing each said block into each said recess.

11. The mold according to claim 2 further comprising a location formation means for resisting slidable movement of said abutment faces relative to one another, said location formation means positioned on said contact faces of said mold parts.

* * * * *